(12) United States Patent
Bator et al.

(10) Patent No.: US 7,587,167 B2
(45) Date of Patent: Sep. 8, 2009

(54) INTEGRATED DIGITAL RADIO MODULE

(75) Inventors: Philip M. Bator, Farmington, MI (US); Jack H. King, Howell, MI (US); Richard D. Zerod, Chelsea, MI (US); Timothy Mitchell, Sylvania, OH (US); Neil A. Tidmarsh, Novi, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 724 days.

(21) Appl. No.: 11/370,420

(22) Filed: Mar. 8, 2006
(Under 37 CFR 1.47)

(65) Prior Publication Data
US 2007/0224962 A1 Sep. 27, 2007

(51) Int. Cl.
*H04H 40/00* (2008.01)
*H04M 1/00* (2006.01)

(52) U.S. Cl. .............. 455/3.01; 455/3.02; 455/3.06; 455/345; 455/569.2; 455/575.9

(58) Field of Classification Search ............... 455/3.01, 455/3.02, 3.04, 3.06, 132–133, 140, 152.1, 455/183.2–186.1, 272, 344–351, 552.1–553.1, 455/569.2, 575.9
See application file for complete search history.

(56) References Cited

U.S. PATENT DOCUMENTS

| 4,943,978 | A | | 7/1990 | Rice |
| 5,339,362 | A | | 8/1994 | Harris |
| 5,535,430 | A | * | 7/1996 | Aoki et al. ............... 455/552.1 |
| 6,005,488 | A | | 12/1999 | Symanow et al. |
| 6,032,089 | A | | 2/2000 | Buckley |
| 6,157,725 | A | | 12/2000 | Becker |
| 6,396,164 | B1 | | 5/2002 | Barnea et al. |
| 6,472,771 | B1 | | 10/2002 | Frese et al. |
| 6,549,774 | B1 | * | 4/2003 | Titlebaum et al. ............ 455/427 |
| 6,563,805 | B1 | * | 5/2003 | Ma et al. .................... 370/325 |
| 6,629,197 | B1 | | 9/2003 | Bhogal et al. |
| 6,847,802 | B2 | * | 1/2005 | Migliaccio .................. 455/45 |
| 7,260,356 | B2 | * | 8/2007 | Helstrom et al. ........... 455/3.02 |
| 2002/0183059 | A1 | | 12/2002 | Noreen et al. |
| 2003/0007649 | A1 | | 1/2003 | Riggs |
| 2003/0060219 | A1 | * | 3/2003 | Parsiokas .................... 455/501 |
| 2003/0086699 | A1 | | 5/2003 | Benyamin et al. |
| 2003/0215102 | A1 | | 11/2003 | Marlowe |
| 2004/0022326 | A1 | | 2/2004 | Morrish et al. |
| 2004/0024652 | A1 | | 2/2004 | Buhse et al. |
| 2004/0151327 | A1 | | 8/2004 | Marlow |
| 2004/0251742 | A1 | | 12/2004 | Runge et al. |
| 2005/0107029 | A1 | | 5/2005 | Walker et al. |

(Continued)

FOREIGN PATENT DOCUMENTS

WO WO 2004/053722 A1 6/2004

(Continued)

*Primary Examiner*—Simon D Nguyen
(74) *Attorney, Agent, or Firm*—Brinks Hofer Gilson & Lione

(57) ABSTRACT

An audio entertainment system having a primary circuit board with a processor in communication with an antenna input, an audio output and a connector. The processor is configured to detect the presence of the digital audio circuit board and to output an audio signal to the audio output based on the wireless signal. The wireless signal may be an AM, FM or digital satellite signal.

21 Claims, 2 Drawing Sheets

U.S. PATENT DOCUMENTS

| | | |
|---|---|---|
| 2005/0215194 A1 | 9/2005 | Boling et al. |
| 2005/0227612 A1* | 10/2005 | Helstrom et al. ........... 455/3.02 |
| 2005/0239434 A1 | 10/2005 | Marlowe |
| 2006/0094349 A1* | 5/2006 | Slesak et al. ............... 455/3.02 |
| 2007/0014536 A1* | 1/2007 | Hellman ...................... 386/94 |
| 2007/0015485 A1* | 1/2007 | DeBiasio et al. ............ 455/345 |

FOREIGN PATENT DOCUMENTS

| | | |
|---|---|---|
| WO | WO 2005/086933 | 9/2005 |

* cited by examiner

INTEGRATED DIGITAL RADIO MODULE

BACKGROUND

1. Field of the Invention

The present invention generally relates to audio entertainment systems and more particularly to audio entertainment systems for motor vehicles.

2. Description of the Known Technology

There are a growing number of audio entertainment systems configured to receive digital satellite signals from services such as Sirius™ and XM™. Digital satellite service offers the listener a wide range of audio channels that typically have an audio quality superior to audio channels transmitted by AM and FM radio stations. Additionally, digital satellite service providers typically fund themselves by charging listeners a fee. By so doing, the amount of time dedicated to commercials is significantly reduced, further enhancing the listening experience.

However, in order to receive digital satellite signals, the audio entertainment system must contain additional hardware for receiving and interpreting digital satellite signals. Manufacturers have found themselves in the dilemma that require them to make separate audio entertainment systems incorporating the hardware for receiving digital satellite signals while, at the time, offering traditional audio entertainment systems that do not include the hardware necessary for receiving digital satellite signals. This need to produce multiple versions of audio entertainment systems significantly increases the cost of development and manufacture because each audio entertainment system must be separately developed and manufactured to include, or not include, the additional hardware necessary for receiving digital satellite signals.

Furthermore, at the present time, there are at least two digital satellite service providers. By having multiple digital satellite service providers, the costs to develop and manufacture multiple audio entertainment systems are further increased. Each audio entertainment system capable of receiving digital satellite signals must have specialized hardware for each specific digital satellite service provider. For example, an audio entertainment system capable of receiving Sirius™ signals cannot receive XM™ signals without additional hardware and vice versa.

Therefore, there is a need for a configurable audio entertainment system that may be configured to receive, or not receive, one or more digital satellite services without the drawback of requiring the manufacturer to significantly invest in the development of multiple versions of the audio entertainment system.

SUMMARY

In overcoming the drawbacks and limitations of the known technologies, an audio entertainment system is disclosed. The system includes a primary circuit board having a processor in communication with a first antenna input, a second antenna input, a tuner and an audio output. The audio output is configured to receive an audio signal selected by the processor.

The primary circuit board further includes a connector in communication with a second antenna input, the audio output and the processor. The connector is capable of being connected to a digital audio circuit board and the processor is configured to detect when the digital audio circuit board is connected to the connector.

In another embodiment, the audio entertainment system includes the digital audio circuit board in communication with the connector. The digital audio circuit board, via the connector, will be in communication with the second antenna input, the audio output and the processor. The digital audio circuit board receives a wireless signal from the second antenna input and outputs a second audio signal to the audio output. The processor prevents the outputting of the first audio signal when the second audio signal is being outputted to the audio output.

Additionally, the processor may be configured to output a channel selection signal to the digital audio circuit board. This channel selection signal will indicate to the digital audio circuit board which audio signals to output to the audio output. Furthermore, the selection signal may further instruct the digital audio circuit board not to output any audio signals to the audio output.

Further objects, features and advantages of this invention will become readily apparent to persons skilled in the art after a review of the following description, with reference to the drawings and claims that are appended to and form a part of this specification.

DETAILED DESCRIPTION

Figure 1:
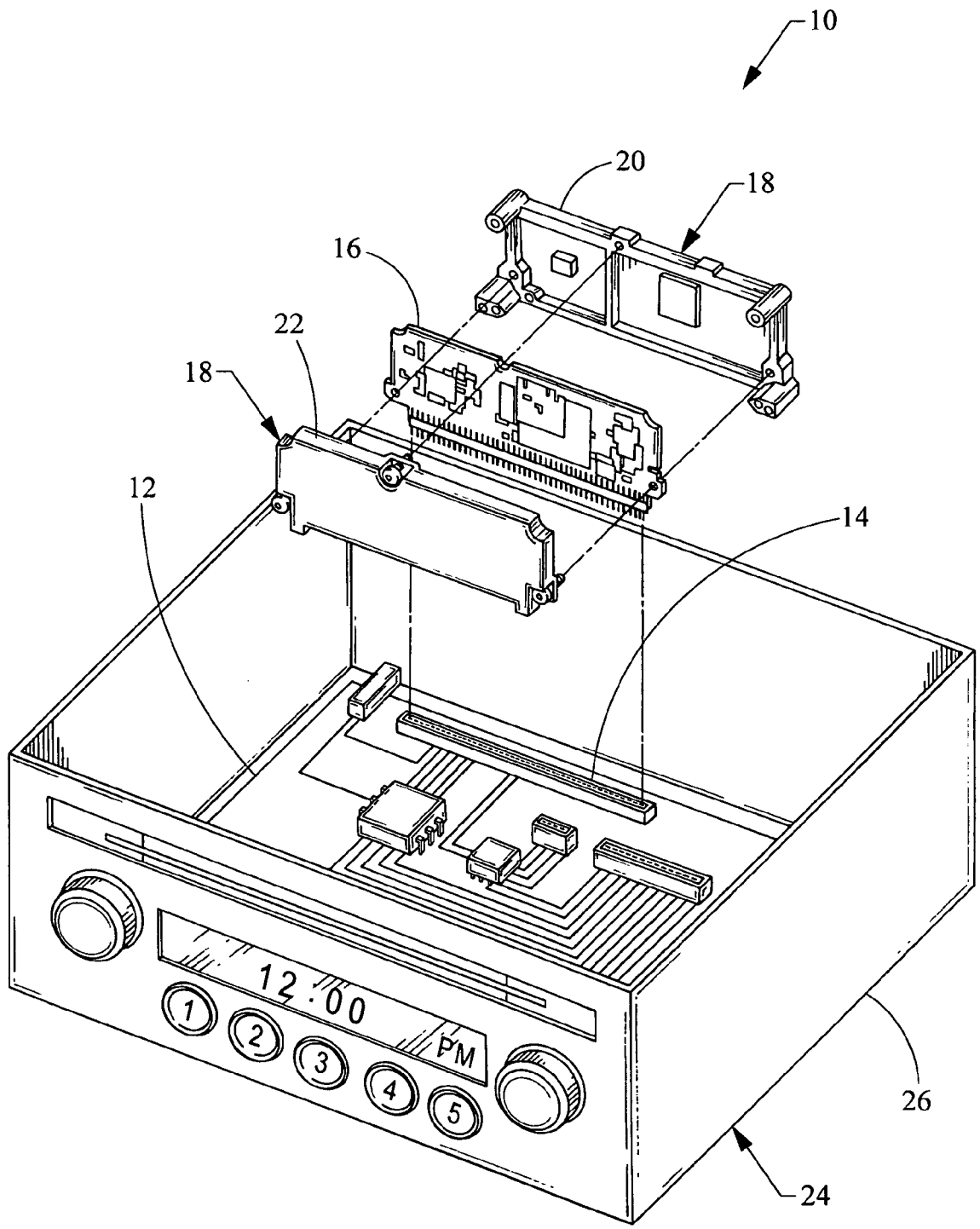
FIG. 1 is an exploded view of an audio entertainment system embodying the principles of the present invention.

Referring to FIG. 1, an audio entertainment system 10 is generally shown. Preferably, the audio entertainment system 10 is located within an automobile. However, the audio entertainment system 10 may be any type of audio entertainment system, including a stand alone audio entertainment system for home or office use.

The audio entertainment system 10 includes a primary circuit board 12 having a connector 14, which are further discussed below. Generally, the connector 14 is a 44 pin connector, but any suitable connector may be utilized. A digital audio circuit board (DACB) 16, which may be optionally provided with the audio entertainment system 10, may be connected to the connector 14. As will be described later, the DACB 16 enables the audio entertainment system 10 to receive and interpret digital satellite signals from digital audio service providers, such as Sirius™, XM™ and others.

Surrounding the DACB 16 is a casing 18 having a first half 20 and a second half 22. The first and second halves 20, 22 are coupled together, thereby substantially encasing the DACB 16 thereby protecting the DACB 16 from external elements and distributing heat generated by the DACB 16. The first and second halves 20, 22 of the casing 18 are made of a thermally conductive material.

Surrounding the primary circuit board and the DACB 16 is a housing 24 having one or more wall portions 26. Typically, the wall portions 26 of the housing 24 are made of a thermally conductive material and may further include a variety of cooling devices including, but not limited to, heat sinks and cooling fans. When in operation, the DACB 16 generates heat, this heat is transferred to the casing 18. Heat generated by the DACB 16 is transferred to the wall portion 26 through a combination of thermal convection and conduction where it will be dissipated from the housing 24.

Figure 2:
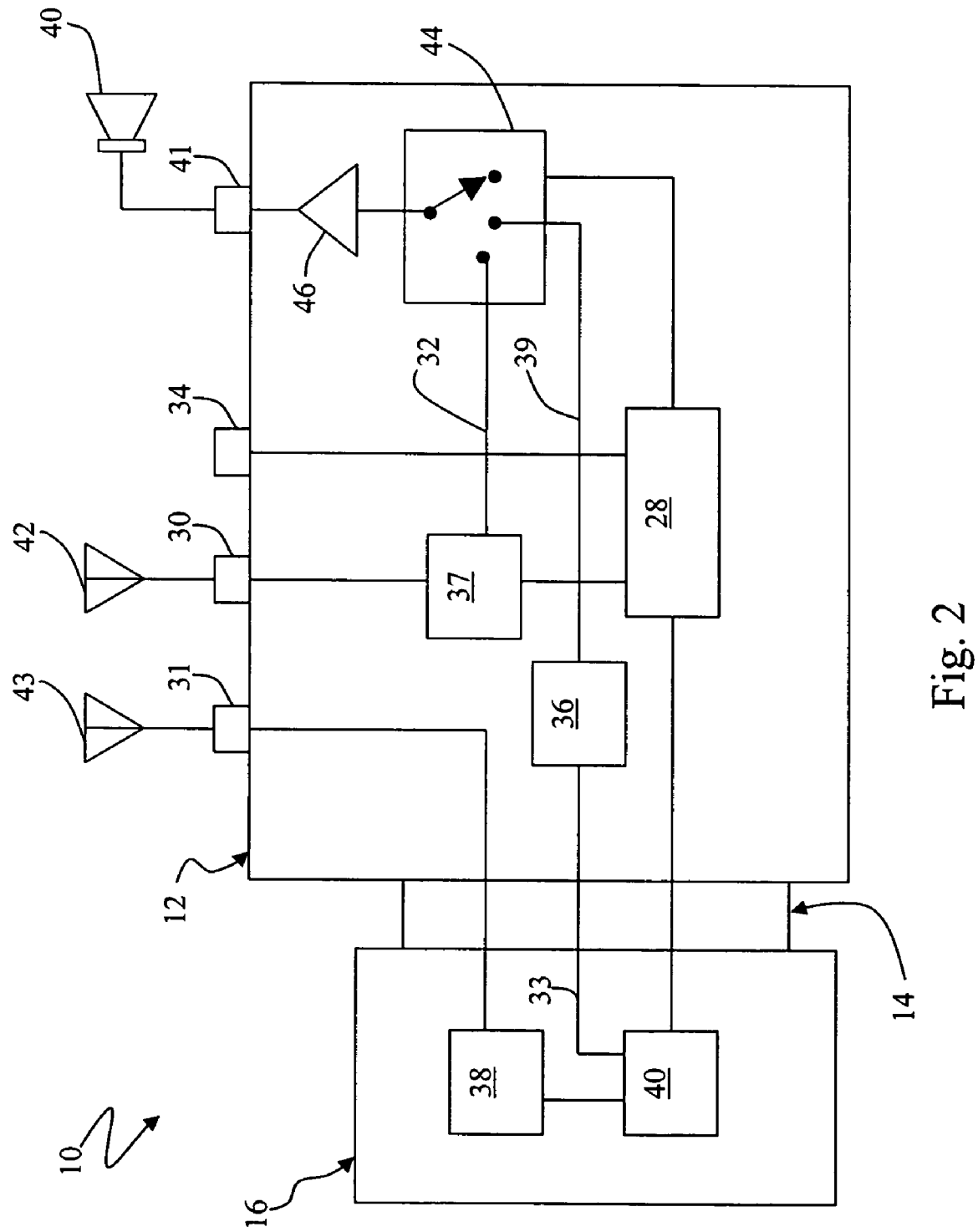
FIG. 2 is a block diagram of the audio entertainment system embodying the principles of the present invention.

Referring to FIG. 2, a block diagram of the audio entertainment system 10 is shown. As stated previously, the audio entertainment system 10 includes a primary circuit board 12 having a connector 14 to which the DACB 16 is connected.

The primary circuit board 12 includes a processor 28, a first antenna input 30, a second antenna input 31, a tuner 37, an audio selection switch 44, an audio amplification module 46, and a speaker output 41. The primary circuit board 12 may also include an accessory port 34 for connecting to any number of devices including, but not limited to, a compact disc player, a DVD player, a personal communication devices, such as a cellular phone, or a vehicle navigation system.

As stated previously, the processor 28 is connected to a tuner 37 which is connected to the first antenna input 30, which in turn is connected to an antenna 42 capable of receiving wireless signals. The wireless signals may include traditional AM and FM signals from AM and FM stations or may include other signals such as the sound channel from television stations. The tuner 37 and the processor 28 receives the wireless signals from the antenna input 30.

The DACB 16 functions to provide information to and from the processor 28 to configure the audio entertainment system 10 to be able to properly interpret digital satellite signals and provide digital audio signals. The DACB 16 may be utilized to interpret digital satellite signal from one or more digital satellite radio service provider such as XM™ and Sirius™ The fundamental premise is that the DACB 16 provides a common interface to the primary circuit board 12, regardless of which digital satellite radio service provider is utilized. In essence, a DACB 16 that utilized a 'Sirius version' could be changed to an 'XM version' by changing the DACB 16 connected to the primary circuit board 12.

In order to accomplish this ability to easily adapt between different digital satellite radio service providers, the connector 14 providing the interface between the DACB 16 and the primary circuit board 12 should have identical mechanical dimensions and mechanical interface to the primary circuit board 12 with interchangeable pin-out functionality. Additionally, there should be common power supply voltage requirements for both the DACB 16 and the primary circuit board 12. Since different chip-sets are utilized in each DACB 16 design, the software control commands for each version would be different. However, the processor 28 would contain software commands for both versions, recognize which version as installed, and provide control using the appropriate commands.

The DACB includes a DACB processor 40 in communication with the processor 28, a DACB audio output 33 and a DACB tuner 38. The DACB tuner 38 is also connected to the second antenna input 31 which in turn is connected to a second antenna 43. The DACB tuner 38 receives the antenna signals from satellite radio stations such as XM™ and Sirius™ and outputs an intermediate signal which contains a plurality of digital satellite channels to the DACB processor 40.

In the event the processor 28 detects the presence of the DACB 16 connected to the connector 14 and the user wishes to listen to a digital satellite radio station, the wireless signal received by the second antenna input 31 will be transmitted to the DACB tuner 38 of DACB 16. Thereafter, the DACB tuner 38 sends the appropriate wireless signal to the DACB processor 40 and the DACB processor 40 selects and converts the wireless signal containing a plurality of digital satellite channels to digital audio signals that are outputted to the DACB audio output 33 and subsequently a digital to analog converter (DAC) 36. The digital audio signals can then be converted to an analog signal by the DAC 36.

The DAC 36 is connected to the audio selection switch 44. From the DAC 36, the analog signal is outputted to the audio selection switch 44 then to the audio amplification module 46 and finally to the speaker output 41 where a speaker system 40, connected to the speaker output 41, will convert the analog signal to an audible sound.

The processor 28 may instruct the DACB processor 40 to tune via the DACB tuner 38 into a specific digital satellite channel. Furthermore, the processor 28 may instruct the DACB processor 40 not to transmit any audio signal to the DACB audio output 32. The processor may also control the state of the audio selection switch 44 to allow selection only of the audio signal from the audio output 32 from tuner 37. By so doing, the processor 28 is able to receive and transmit the audio output 32 without any interference from a digital satellite signal or station. In like manner, the processor 28 may withhold tuner 37 from transmitting anything to the audio output 32 because the DACB processor 40 will be transmitting to the DACB audio output 33. The processor may also control the state of the audio selection switch 44 to allow selection only of the analog signal from the DAC 36. By so doing, the audio amplification module 46 receives the output of the DAC 36 and not the output of the tuner 37.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

The invention claimed is:

1. An audio entertainment system, the system comprising:
a primary circuit board having a processor in communication with a first antenna input and a second antenna input and an audio output, the first antenna input being configured to receive a first wireless signal having at least one channel and the second antenna input being configured to receive a second wireless signal having at least one channel;
a tuner in communication with the processor and the audio output;
a connector in communication with the second antenna input, the audio output and the processor, the connector being configured to engage a corresponding connector of a digital audio circuit board, the processor being configured to detect when the digital audio circuit board is connected to the connector;
the audio output being configured to receive a first audio signal from the tuner and to receive a second audio signal from the digital audio circuit board; and
the processor configured to instruct the tuner to output the first audio signal to the audio output, the first audio signal being based on the at least one channel of the first wireless signal.

2. The system of claim 1, wherein the processor being configured to prevent the outputting of the first audio signal to the audio output when the second audio signal is being outputted to the audio output.

3. The system of claim 1, further comprising the digital audio circuit board being in communication with the second antenna input, the audio output and the processor via the connector, the digital audio circuit board also being configured to receive the second wireless signal from the second antenna input and to output the second audio signal to the audio output, the second audio signal being based on the at least channel of the second wireless signal.

4. The system of claim 3, wherein the processor being configured to prevent the outputting of the first audio signal to the audio output when the second audio signal is being outputted to the audio output.

5. The system of claim 3, wherein the processor of the primary circuit board further comprises a control signal output and the digital audio circuit board further comprises a control signal input, the control signal output being connected to the control signal input by the connector;
the processor being configured to output a channel selection signal to the digital audio circuit board via the control signal output, whereby the digital channel selection signal instructs the digital audio circuit board to output to the audio output a specific channel of the second wireless signal;
the processor being configured to a output cancelling signal to the digital audio circuit board via the control signal output, whereby the cancelling signal instructs the digital audio circuit board to not output any channel of the second wireless signal to the audio output.

6. The system of claim 3, further comprising:
a casing substantially encapsulating the digital audio circuit board;
a housing surrounding the primary circuit board and the digital audio circuit board, the housing having a wall portion in proximity to the digital audio circuit board;
the casing being in thermal communication with the wall portion, whereby heat generated by the digital audio circuit board is transferred to the wall portion via the casing.

7. The system of claim 1, wherein the first wireless signal is at least one of an AM radio signal and a FM radio signal.

8. The system of claim 1, wherein the second wireless signal is a satellite radio signal.

9. The system of claim 1, wherein the connector is a 44 pin connector.

10. The system of claim 1, wherein the primary circuit board further comprises a digital to analog converter in communication with the audio output, whereby the digital to analog converter converts to an analog signal the second audio signal.

11. The system of claim 10, further comprising a speaker system being in communication with the first and second audio signals whereby the speaker system converts the analog signal to an audible sound.

12. A vehicle audio entertainment system, the system comprising:
a primary circuit board to be located within the vehicle, the primary circuit board having a processor in communication with a first antenna input and a second antenna input and an audio output, the first antenna input being configured to receive a first wireless signal having at least one channel and the second antenna input being configured to receive a second wireless signal having at least one channel;
a connector in communication with the second antenna input, the audio output and the processor;
a digital audio circuit board removeably connected to the connector and in communication with the second antenna input, the audio output and the processor via the connector, the digital audio circuit board being configured to receive the second wireless signal from the second antenna input and to output the second audio signal to the audio output, the second audio signal being based on the at least channel of the second wireless signal;
a tuner in communication with the processor and the audio output;
the processor being further configured to detect if the digital audio circuit board is connected to the connector;
the audio output being configured to receive a first audio signal from the tuner and a second audio signal from the digital audio circuit board; and
the processor being configured to output the first audio signal to the audio output, wherein the first audio signal is based on the at least one channel of the first wireless signal.

13. The system of claim 12, wherein the processor being configured to prevent the outputting of the first audio signal to the audio output when the second audio signal is being outputted to the audio output.

14. The system of claim 12, wherein the processor of the primary circuit board further comprises a control signal output and the digital audio circuit board further comprises a control signal input, the control signal output being connected to the control signal input by the connector;
the processor being configured to output a channel selection signal to the digital audio circuit board via the control signal output, whereby the digital channel selection signal instructs the digital audio circuit board to output to the audio output a specific channel of the second wireless signal; and
the processor being configured to a output a canceling signal to the digital audio circuit board via the control signal, whereby the cancelling signal instructs the digital audio circuit board to not output any channel of the second wireless signal to the audio output.

15. The system of claim 12, further comprising:
a casing substantially encapsulating the digital audio circuit board;
a housing surrounding the primary circuit board and the digital audio circuit board, the housing having a wall portion in proximity to the digital audio circuit board, wherein the casing is in thermal communication with the wall portion and heat generated by the digital audio circuit board is transferred to the wall portion via the casing.

16. The system of claim 15, wherein the first wireless signal is at least one of an AM signal and a FM signal.

17. The system of claim 12, wherein the second wireless signal is a digital satellite signal.

18. The system of claim 12, wherein the connector is a 44 pin connector.

19. The system of claim 12, wherein the primary circuit board further comprises a digital to analog converter in communication with the audio output, whereby the digital to analog converter converts the at least one of the first audio signal and the second audio signal to an analog signal.

20. The system of claim 19, further comprising a speaker in communication with the digital to analog converter, the speaker configured to convert the analog signal to an audible sound.

21. The system of claim 12, wherein the system is installed in a vehicle.

* * * * *

UNITED STATES PATENT AND TRADEMARK OFFICE
CERTIFICATE OF CORRECTION

PATENT NO. : 7,587,167 B2  Page 1 of 1
APPLICATION NO. : 11/370420
DATED : September 8, 2009
INVENTOR(S) : Philip M. Bator et al.

It is certified that error appears in the above-identified patent and that said Letters Patent is hereby corrected as shown below:

In the Claims

In column 4, claim 3, line 67, before "channel of the second" insert --one--.

In column 6, claim 12, line 3, before "channel of the second" insert --one--.

In column 6, claim 14, line 30, after "configured to a output a" replace "canceling" with --cancelling--.

Signed and Sealed this

Fifth Day of January, 2010

David J. Kappos
*Director of the United States Patent and Trademark Office*